United States Patent Office 3,703,352
Patented Nov. 21, 1972

---

3,703,352
TREATMENT OF KERATINOUS FIBRES
AND FABRICS
Bryan Dobinson, Duxford, Paul Hope, Saffron Walden, Kenneth Winterbottom, Whittlesford, and Trevor Shaw, Ilkley, England, assignors to Ciba-Geigy AG, Basel, Switzerland, and I.W.S. Nominee Company Limited, London, England
No Drawing. Filed Nov. 9, 1970, Ser. No. 88,246
Claims priority, application Great Britain, Nov. 14, 1969, 55,992/69
Int. Cl. D06m 3/02
U.S. Cl. 8—128 A                               20 Claims

ABSTRACT OF THE DISCLOSURE

A process for modifying keratinous material which comprises
(1) treating the material with an ester which contains at least two mercaptan groups per molecule and which is a product of the reaction of
 (a) at least one monomercaptomonocarboxylic acid or monomercaptomonohydric alcohol,
 (b) at least one compound containing, per molecule, at least two alcoholic hydroxyl groups or at least one 1,2-epoxide group, and
 (c) at least one compound containing, per molecule, at least two carboxylic acid groups, or an anhydride thereof, and
(2) curing the ester on the material.

By this process the keratinous material is rendered resistant to shrinkage, and durable press characteristics are imparted to it. Keratinous material so treated is washable without essential lost of its finish and keeps its smooth handle.

---

The present invention relates to a process for modifying keratinous material, and, in particular, to a process for rendering the material resistant to shrinkage and to a process for imparting durable press characteristics to the material.

A number of shrink-resist processes for keratinous material are known, some of which comprise the application of a resin to the material which may be in fabric or fibre form. Shrink-resist processes stabilize the dimensions of keratinous materials against shrinkage due to felting.

Durable press processes for keratinous material are also known and many of them employ resins the same or similar to those used in shrink-resist processes. In some durable press processes the desired shape is imparted to the keratinous material before the resin is cured and then curing is allowed to take place whilst the material is maintained in the desired shape, e.g. in form of creases or pleats. In others the resin is applied after the desired shape is imparted to the material. Durable press processes stabilize the shape and surface smoothness of the material against the effects of agitation in the presence of aqueous solutions. The desired shape may be imparted to the material before or after resin treatment by well known methods involving the use of setting agents such as water, reducing agents, and bases.

A desirable, though not essential, feature of shrink-resist and durable press processes is that the keratinous material so treated should be washable in domestic washing machines. To be machine-washable the finish on the treated material should withstand vigorous agitation in warm or hot water containing detergents, and this requirement sets a severe test for the durable press and shrink-resist treatments.

We have now found that certain esters containing mercaptan (—SH) groups can be used successfully in durable press and shrink-resist processes and do not impart an unattractive handle to the treated material. These esters cure, i.e. undergo reaction, on the keratinous fibre, apparently through their mercaptan groups, and we have further found that the rate of curing may be largely controlled by selection of the appropriate catalyst.

Accordingly, the present invention provides a process for modifying keratinous material which comprises
(1) treating the material with an ester which contains at least two mercaptan groups per molecule and which is a product of the reaction of
 (a) at least one monomercaptomonocarboxylic acid or monomercaptomonohydric alcohol,
 (b) at least one compound containing, per molecule, at least two alcoholic hydroxyl groups or at least one 1,2-epoxide group, and
 (c) at least one compound containing, per molecule, at least two carboxylic acid groups, or an anhydride thereof, and
(2) curing the ester on the material.

The invention also provides keratinous material bearing thereon an ester as aforesaid, in the cured or still curable state.

The treatment according to the invention, whether to achieve shrink-resist or durable press effects, provides fibers or garments which will withstand washing in machines and still retain their original dimension and shape. The treated material also has good recovery from wrinkling, which is an important attribute in fabrics employed in trousers where there is a strong tendency to wrinkles in the areas of the knee and back of the knee. Of course, wrinkle-resistance is an important advantage in many garments.

The polymercaptan esters used in the process according to the invention, as well as inhibiting or preventing felting shrinkage, also inhibit or prevent relaxation shrinkage, which is an important problem associated with knitted goods.

The term "keratinous material" as used throughout this specification includes all forms of keratinous fibres or fabrics and garments made therefrom, e.g. fleeces, tops, card sliver, noils, yarns, threads, pile fabrics, non-woven fabrics, woven fabrics and knitted goods. In most cases the treatment will be applied to fabrics or made-up garments though it is quite feasible, and may be desirable in some circumstances, to shrink-resist fibres, e.g. in the form of tops. The material to be treated can consist either wholly of keratinous fibres or of blends of these fibres with synthetic fibrous and filamentary material such as polyamides, polyesters, and poly(acrylonitrile), and with cellulosic and regenerated cellulosic material. In general, however, the material should contain at least 30% by weight of keratinous fibres and best results are obtained with substantially 100% keratinous fibre-containing material.

The keratinous material may be virgin or reclaimed: preferably, though not necessarily, it is sheep's wool. It may also be derived from alpaca, cashmere, mohair, vicuna, guanaco, camel hair, or llama, or blends of these materials with sheep's wool.

To prepare esters containing two or more mercaptan groups per molecule from a monomercaptomonocarboxylic acid or a monomercaptomonohydric alcohol it is necessary to react the said acid or alcohol with a compound having two or more hydroxyl groups or two or more carboxyl groups per molecule respectively. However, as those skilled in the art of making polyesters will appreciate, excessive quantities of compounds containing more than two hydroxyl or carboxyl groups should not be used, otherwise gelation may occur.

Preferred polymercaptans for use in the process according to the invention are those esters containing on average at least three, and preferably not more than six, mercaptan groups per molecule and usually have an average molecular weight of between 400 and 10,000, but, if desired, esters having an average molecular weight of up to 20,000 or even 40,000 may be used.

Such esters may be those obtainable by the reaction, in any desired sequence, of (a) a monomercaptomonocarboxylic acid or a monomercaptomonohydric alcohol,
(d) a compound containing two, but not more than two, alcoholic hydroxyl groups per molecule,
(e) a compound containing, per molecule, at least three carboxylic acid groups, or an anhydride thereof.

If desired, components (d) and (e) may be caused to react to form a hydroxyl or carboxyl-terminated ester and this is then esterified with (a).

Similarly, there may be employed esters obtainable by the reaction, in any desired sequence, of (a) a monomercaptomonohydric alcohol or a monomercaptomonocarboxylic acid,
(f) a compound containing at least three alcoholic hydroxyl groups per molecule, and
(g) a compound containing, per molecule, two, but not more than two, carboxylic acid groups, or an anhydride thereof.

Also, if desired, components (f) and (g) may be caused to react to form a carboxyl or hydroxyl-terminated ester and this is then esterified with (a).

Further, two or more monomercaptocarboxylic acids, two or more monomercaptomonohydric alcohol, two or more alcohols, or two or more acids and/or their anhydrides, can be used.

Other esters which may be utilised in the process of this invention are those obtainable by reaction, in any desired sequence, of (a) a monomercaptomonocarboxylic acid or a monomercaptomonohydric alcohol,
(d) a compound containing two, but not more than two, alcoholic hydroxyl groups per molecule,
(g) a compound containing, per molecule, two, but not more than two, carboxylic acid groups, or an anhydride thereof, and either
(e') a compound containing, per molecule, at least three, but not more than six, carboxylic acid groups per molecule, or an anhydride thereof, or
(f') a compound containing at least three, but not more than six alcoholic hydroxyl groups per molecule.

The esters are prepared in a known manner, preferably by heating the reactants together in the presence of a catalyst such as a strong acid, especially an anion exchange resin, toluene-p-sulphonic acid, or 50% sulphuric acid, and of an inert solvent, such as toluene, xylene, trichloroethylene, or perchloroethylene, with which water formed in the reaction can be removed as an azeotrope.

Monomercaptomonocarboxylic acids used as component (a) are usually of Formula HOOC.R.SH, where R denotes a divalent organic radical, the indicated HOOC— group being directly bound to a carbon atom of the radical R and the indicated —SH group being directly bound to the same or to a different carbon atom of the radical R. Preferably they are also of formula $$HOOC \cdot C_rH_{2r}SH$$

where $r$ is a positive integer, from 1 to as high as 18 or even 24. They may thus be used mercaptoundecylic acid, o- and p-mercaptobenzoic acids, and especially thioglycollic acid and 2- and 3-mercaptopropionic acid, i.e. $r$ in the above formula is 1 or 2.

Monomercaptomonohydric alcohols used as component (a) are usually of formula HO.R.SH, where R has the meaning previously assigned, the HO— group and the —SH group being directly bound to carbon atoms of the radical R. Preferably they are also of formula $$HO.C_tH_{2t}SH$$

where $t$ is a positive integer of from 2 to 18 and especially preferred are those of the foregoing formula where $t$ is 2 or 3, such as 2-mercaptoethanol, 1-mercaptopropan-2-ol and 2-mercaptopropan-1-ol; but substances such as 1-chloro-3-mercaptopropan-2-ol may also be used.

Esters preferred for use in the process of this invention contain, directly attached to carbon atoms, on average $n$ groups of formula

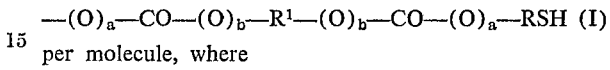

per molecule, where $a$ and $b$ are each zero or 1, but are not the same,
$n$ is an integer of at least 3 and at most 6,
$R^1$ denotes a divalent organic radical which is directly linked through a carbon atom or carbon atoms thereof to the indicated —O— or —CO— units, and
R has the meaning previously assigned.

More specifically, the average structures of the preferred esters can be represented by one of the formulae

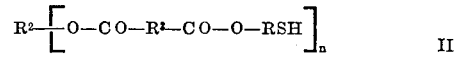  II

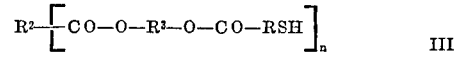  III

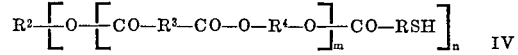  IV

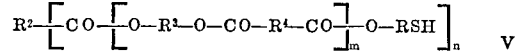  V

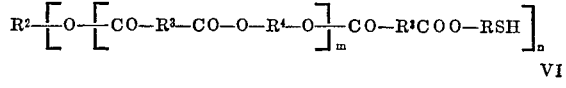  VI

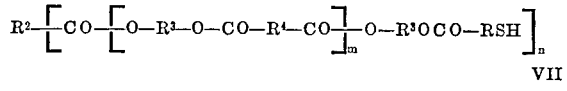  VII and especially those of the formulae

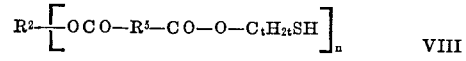  VIII

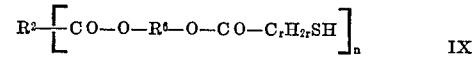  IX

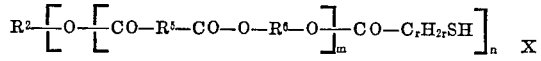  X

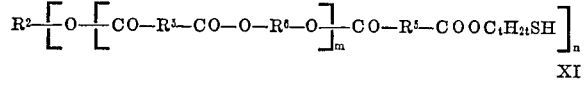  XI

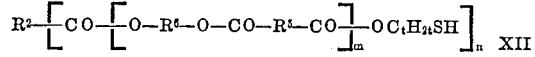  XII

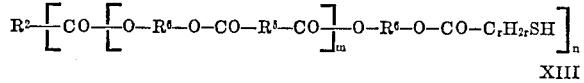  XIII where $R^2$ denotes an organic radical containing at least three carbon atoms and directly linked through carbon atoms thereof to the indicated mercaptan-terminated ester chains, $R^3$ and $R^4$ each denote a divalent organic radical which is directly linked through a carbon atom or carbon atoms thereof to the indicated —O— or —CO— units, R⁵ denotes the residue of an aliphatic, cycloaliphatic, or aromatic dicarboxylic acid after removal of the —COOH groups, R⁶ denotes the residue of an aliphatic, araliphatic or cycloaliphatic diol after removal of the two hydroxyl groups, $m$ is an integer of at least 1, and $n$, $r$, and $t$ have the meanings previously assigned.

It will be understood that Formulae II to XIII represent the average structure of the esters. Because of incomplete esterification, other substances may be present. The esters may also incorporate a mercaptan-free monocarboxylic acid or a mercaptan-free monohydric alcohol. Thus there may be used esters obtainable by the reaction, in any desired sequence, of (a) a monomercaptomonocarboxylic acid or a monomercaptomonohydric alcohol (e″) a compound containing, per molecule, at least two but not more than six, carboxylic acid groups per molecule or an anhydride thereof.

(f″) a compound containing, per molecule, at least two but not more than six alcoholic hydroxyl groups per molecule, and (h) a mercapto-free monohydric alcohol or (i) a mercapto-free monocarboxylic acid.

To obtain the preferred polyesters, i.e. those containing at least three —SH groups per average molecule, the acid (e″) should contain at least three carboxylic acid groups and/or the alcohol (f″) should contain at least three alcoholic hydroxyl groups.

Examples of compounds (h) are lauryl and stearyl alcohols; examples of compounds (i) are lauric, stearic, pelargonic, and benzoic acids.

Further, as already indicated, not all units designated R, R¹, R², R³, R⁴, R⁵, and R⁶, need be the same: if desired, two or more polycarboxylic acids, and/or two or more polyhydric alcohols, may be used, so that successive R¹, R³, R⁴, R⁵, and R⁶ units may be different.

Yet further preferred are the esters of the foregoing formulae in which

R⁵ denotes an aliphatic hydrocarbon residue containing from 1 to 6 carbon atoms, a phenylene group, or a cycloaliphatic hydrocarbon residue containing from 6 to 34 atoms, and R⁶ denotes an aliphatic hydrocarbon residue containing from 2 to 6 carbon atoms, or a chain composed of repeating oxyalkylene units each containing 2 to 4 carbon atoms, an araliphatic hydrocarbon containing 1 or 2 phenylene groups and not more than 24 carbon atoms, or a cycloaliphatic hydrocarbon residue containing at least one six-membered carbocyclic ring and at least 6 but at most 15 carbon atoms.

Dihydric alcohols which may be used as component (b) or (d) include ethylene glycol, propylene glycol, propane-1,3-diol, butane-1,2-diol, butane-1,3-diol, butane-1,4-diol, butane-2,3-diol, poly(oxyethylene) glycols, poly(oxypropylene) glycols, poly(oxybutylene) glycols, poly(oxy-1,1-dimethylethylene) glycols, and polyepichlorohydrins. Mixed dihydric polyethers obtained by treating an initiator containing active hydrogen, such as ethylene glycol, with an alkylene oxide, such as propylene oxide, and then "tipping" the product with a different alkylene oxide, e.g. ethylene oxide, may also be used. Other suitable dihydric alcohols include adducts of alkylene oxides such as ethylene oxide with ammonia, amines, and dihydric phenols.

In place of the dihydric alcohol there may be used a mono-1,2-epoxide as component (b) or (d), especially alkylene oxides such as ethylene oxide, propylene oxide, butylene oxide, 1,1-dimethylethylene oxide, and epichlorohydrin; glycidyl ethers of alcohols such as n-butyl glycidyl ether and iso-octyl glycidyl ether, or of phenols such as phenyl glycidyl ether and p-tolyl glycidyl ether; N-glycidyl compounds such as N-glycidyl-N-methylaniline and N-glycidyl-n-butylamine; and glycidyl esters of carboxylic acids such as glycidyl acrylate and glycidyl acetate.

Dicarboxylic acids, and their anhydrides where existing, which may be used as component (c) or (g) include: succinic acid, glutaric acid, adipic acid, sebacic acid, dimerised linoleic acid, phthalic acid, isophthalic acid, terephthalic acid, and hexahydrophthalic acid. Acids having an ethylenic unsaturation, such as maleic, fumaric, nonenylsuccinic and dodecenylsuccinic may be used but only under special conditions.

As the component (b), (f) or (f′) containing three or more alcoholic hydroxy groups per molecule there may be used, for example, glycerol, 1,1,1-trimethylolethane, 1,1,1-trimethylolpropane, hexane-1,2,5-triol, hexane-1,2,6-triol, pentaerythritol, 3-hydroxymethylpentane-2,4-diol, mannitol, sorbitol, and adducts of ethylene oxide or propylene oxide with such alcohols. Alternatively, monoepoxymonohydric alcohols such as glycidol, or a diepoxide such as a diglycidyl ether of an alcohol or a phenol, can be used. Substances containing more than two carboxylic acid groups per molecule, or anhydrides thereof, which may be used as the component (c), (e) or (e′) include citric acid, tricarballylic acid, pyromellitic acid, and trimerised linoleic acid.

The polymercaptan esters may be used alone or in association with other resins or with resin-forming substances, such as aminoplasts, other polymercaptans, epoxy resins (i.e. substances containing on average more than one 1,2-epoxide group per molecule), acrylic resins, including polymers and copolymers of acrylate esters, e.g. ethyl, n-butyl and 2-hydroxyethyl acrylates, and acrylamide, or polyisocyanates, for example prepolymers of a polyoxyalkylene glycol and an aromatic diisocyanate or of a poly(oxylkylene) triol and an aliphatic diisocyanate.

Examples of other polymercaptans which may be used in association with those employed in the process of this invention are those of the formulae

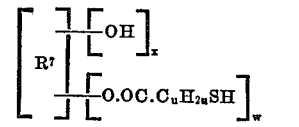

and

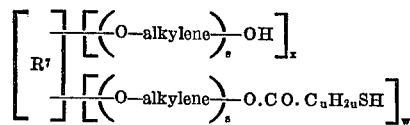

in which

R⁷ represents an aliphatic radical containing at least two carbon atoms, preferably a hydrocrbon radical containing not more than six carbon atoms, $w$ denotes an integer of at least 2 and at most 6, $x$ denotes zero or a positive integer such that $(w+x)$ is at most 6, $u$ denotes a positive integer of at most 2, each "alkylene" group contains a chain of at least 2, and at most 6, carbon atoms beween the indicated consecutive oxygen atoms, and $s$ denotes an integer, which may have different values in each chain, such that the molecular weight of the ester is at least 400 and at most 10,000.

Many of the polymercaptan esters are insoluble in water but can be applied as aqueous dispersions or emulsion. Preferably they are applied to fabrics and garments from organic solvents, for example alcohols, lower ketones such as ethyl methyl ketone, benzene, and halogenated hydrocarbon solvents, especially chlorinated and/or fluorinated hydrocarbons containing not more than three carbon atoms such as the dry cleaning solvents, carbon tetrachloride, trichloroethylene, and perchloroethylene.

Aqueous emulsions which are a convenient vehicle for applying the polymercaptans used in the process of this invention comprise (i) a polymercaptan ester as aforesaid
(ii) an emusifying agent
and, optionally,
(iii) a protective colloid such as sodium carboxymethylcellulose or methylvinyl ether homopolymers or copolymers with e.g., maleic anhydride.

The amount of polymercaptan ester used depends on the effect desired. For most purposes from 0.5 to 15% by weight based on the material treated is preferred. Stabilization of knitted fabrics usually requires from 1 to 10% by weight of the resin. A high level of shrink-resistance, crease-setting, and substantial resistance to wrinkling can be achieved on woven fabrics with rather smaller quantities, especially from 1 to 5% by weight. The "hand," or "handle" of the treated material will, of course, depend on the amount of polymercaptan ester employed and by simple experiment the least amount of the polymercaptan required to give the desired effect may readily be determined. Further, the construction of the fabric may also influence the amount of polymercaptan ester required.

The desired effects are not fully obtainable until the polymercaptan ester on the material has substantially cured. At ordinary temperatures this may take from five to ten days or even longer. The curing or "fixing" reaction can, however, be accelerated greatly by the use of a catalyst, and generally it is preferred to add the catalyst to the material to be treated at the same time as the polymercaptan ester is applied although it may be added before or afterwards if desired. The curing time can be controlled by selecting an appropriate catalyst and the choice of curing time will depend on the particular application of the process according to the invention.

The catalysts may be organic or inorganic bases, siccatives, oxidative curing agents, and free-radical catalyst such as azodi-isobutyronitrile, peroxides and hydroperoxides, or combinations of these. As organic bases there may be used primary or secondary amines, especially the lower alkanolamines, e.g. mono- and di-ethanolamine, and lower polymaines, e.g. ethylenediamine, diethylenetriamine, triethylenetetramine, tetraethylenepentamine, propane-1,2 - diamine, propane-1,3-diamine, and hexamethylenediamine. As inorganic bases there may be used the water-soluble oxides and hydroxides, e.g. sodium hydroxide, and also ammonia. Examples of suitable siccatives are calcium, copper, iron, lead, cerium, and cobalt naphthenates. Examples of peroxides and hydroperoxides which may be used are cumene hydroperoxide, tert.-butyl hydroperoxide, dicumyl peroxide, dioctanoyl peroxide, dilauryl peroxide, ethyl methyl ketone peroxide, diisopropyl peroxydicarbonate, hydrogen peroxide and chlorobenzoyl peroxide. Other types of catalysts include sulphur, and sulphur-containing organic compounds in which the sulphur is not exclusively present in mercaptan groups, namely, mercaptobenzothiazoles or derivatives thereof, dithiocarbamates, thiuram sulphides thioureas, dialkyl, dicycloalkyl or diaralkyl disulphides, alkyl xanthogen disulphides, and alkyl xanthates.

The fibres and fabrics are preferably treated at a pH greater than 7, typically 7.5 to 12: under acid conditions the polymercaptan esters tend to cure more slowly.

The amount of catalyst used can vary widely. However, in general from 0.1 to 20%, preferably 1 to 10%, by weight based on the weight of polymercaptan ester used is required, although much larger quantities can be used.

Curing of the polymercaptan ester is also assisted by using elevated temperatures and if especially rapid results are required then temperatures in the range 30° to 180° C. may be used. High humidities also tend to accelerate curing in the presence of catalysts.

The polymercaptan ester, and the catalyst if used, can be applied to the keratinous material in conventional ways. For example, where wool tops or where fabrics is to be treated, it may be impregnated by padding or by immersing in a bath. If garments or garment pieces are to be treated then it is convenient to spray them with the polymercaptan, and more convenient still to tumble the garments in a solution of the polymercaptan. For the latter method a dry-cleaning machine is a particularly useful apparatus for carrying out the process.

If a shrink-resist treatment is required, then it is usually more convenient to apply the polymercaptan ester to the fabric although, as previously stated, it may be applied to the fibres in the form of tops or card sliver. The fabric may be "flat-set" before or after treatment with the polymercaptan and by this means the fabric will, in addition to retaining substantially its original dimensions, also retain its flat smooth appearance during wear and after washing. It should be stated, however, that flat-setting may not be necessary or even desirable with certain types of cloth. Flat-setting is normally carried out either by treating the cloth with steam at superatmospheric pressure, or by treating the cloth with steam at atmospheric pressure in the presence of a setting agent and moisture and maintaining the cloth in a flat state. Flat-setting may also be achieved by applying high concentrations of a reducing agent and a swelling agent, and maintaining the cloth in a flat state during washing off the excess reagents. In another method flat-setting may be achieved by impregnating the material with a swelling agent and an alkanolamine carbonate, e.g. urea and diethanolamine carbonate, drying the material and then semi-decatising it. Of course, if desired, the fabric may be set in the presence of the polymercaptan, thus effecting setting and shrinkproofing treatments simultaneously.

If a durable press treatment is requried, there are a number of ways this may be achieved. One method is to treat the material with the polymercaptan ester, make the material up into garments or garment pieces and insert therein pleates or creases, using reducing agents, bases, or superheated steam as setting agents. Again, the polymercaptan may be applied to the fibres at any stage during the manufacture of the fabric, e.g. in top form, in yarn, or in fabric form. If desired, agents which block the thiol groups of the wool, e.g. formaldehyde or higher aldehydes, may be applied to the creased or pleated garments after curing the polymercaptan.

A preferred method of applying the polymercaptan to obtain a durable press effect comprises treating the made-up garment or garment piece, which is already set in the desired configuration, e.g. creases or pleats imparted thereto, with the polymercaptan dissolved in an organic solvent. In this method it is essental that the polymercaptan is applied in an organic solvent because treatment with aqueous systems would only serve to remove the creases or pleats already set in the fabric. An alternative method comprises impregnating the fabric with the polymercaptan in the area where a fold, such as a crease or pleat, is to be inserted, imparting the desired configuration, and maintaining it in this position whilst heat and pressure are applied.

A further method for flat-setting and shrinkproofing keratinous fabrics comprises treating the fabric with a setting agent and setting it in a flat configuration by heating the fabric while wet, impregnating it with an aqueous emulsion or dispersion of the polymercaptan, and catalyst if required, drying the fabric, and curing the polymercaptan. Finally the fabric is made into garments, and creases or pleats set therein if desired by steaming in the presence of a setting agent such as monoethanolamine sesquisulphite.

The setting of the fabric, whether carried out before or after treatment with the polymercaptan ester, may be effected using any of the known methods, for example by means of setting agents e.g. reducing agents, bases, water, and superheated steam. Monoethanolamine sesquisulphite is the most frequently used setting agent and may be used in association with a swelling agent, e.g. urea.

The compositions used in the process of this invention may contain antisoiling, antistatic, bacteriostatic, rotproofing, flameproofing and wetting agents. They may also contain water-repellents such as paraffin wax, and fluorescent brightening agents.

The invention will now be illustrated by reference to the following examples. Unless otherwise specified, parts and percentages are by weight.

The treated samples of cloth were washed at 40° C. in an English Electric Reversomatic washing machine set on programme 5 with the timing control set on No. 1 in an aqueous solution containing, per litre, 2 g. of soap flakes and 0.8 g. of anhydrous sodium carbonate, using a liquor/sample ratio of about 30:1. The samples were rinsed in cold water, spun in the machine, and then dried for 30 minutes in a Parnall Tumble Drier on full heat. Shrinkage was measured as the difference in dimensions of the fabric before and after washing. Area shrinkage was calculated from linear shrinkage measurements.

The polymercaptan esters used in these examples were prepared as follows.

POLYMERCAPTAN A

A mixture of hexane-1,2,6-triol (13.4 g., 0.3 equiv.), "Dimer acid Empol 1022" (234.0 g., 0.8 equiv.), hexane-1,6-diol (47.2 g., 0.8 equiv.), thioglycollic acid (27.6 g., 0.3 equiv.), toluene-p-sulphonic acid (2.5 g.) and perchloroethylene (300 ml.) was heated to reflux with stirring for 5 hours under nitrogen. Water (20 ml.) formed during the reaction was removed as its azeotrope. The mixture was washed with water until the washings had pH 5–6, then the solvent was removed by distillation in vacuo. The residue (Polymercaptan A) (300 g.) had a thiol value of 0.94 equiv./kg. (calculated value, 0.99 equiv./kg.).

"Dimer acid Empol 1022" is available from Unilever-Emery N.V., Gouda, Holland. It is a dimerised unsaturated $C_{18}$ fatty acid, having an average molecular weight of about 570 and a carboxyl content of about 3.4 equiv./kg.

Other polymercaptan polyesters were prepared similarly, as shown in Table I. For making Polymercaptan S, 1 ml. of 50% sulphuric acid was used instead of toluene-p-sulphonic as the catalyst.

TABLE I

| Polymer-captan | Components — Substance | Molar ratio | Thiol content equivalent/kg. |
|---|---|---|---|
| B | 1,1,1-trimethylolpropane | 1 | 1.88 |
|   | Polyoxypropylene glycol, average molecular weight 425. | 2 | 1.88 |
|   | Adipic acid | 2 | 1.88 |
|   | Thioglycollic acid | 3 | 1.88 |
| C | Glycerol | 1 | 2.35 |
|   | Adipic acid | 4 | 2.35 |
|   | Butane-1,4-diol | 4 | 2.35 |
|   | Thioglycollic acid | 3 | 2.35 |
| D | "Trimer acid Empol 1043" | 1 | 1.64 |
|   | Butane-1,4-diol | 3 | 1.64 |
|   | Thioglycollic acid | 3 | 1.64 |
| E | Polyoxypropylene triol, average molecular weight 700. | 1 | 1.78 |
|   | Adipic acid | 3 | 1.78 |
|   | Butane-1,4-diol | 3 | 1.78 |
|   | Thioglycollic acid | 3 | 1.78 |
| F | Hexane-1,2,6-triol | 1 | 0.99 |
|   | "Dimer acid Empol 1022" | 2 | 0.99 |
|   | Polyoxypropylene glycol, average molecular weight 425. | 2 | 0.99 |
|   | Thioglycollic acid | 3 | 0.99 |
| G | Glycerol | 1 | 2.07 |
|   | Adipic acid | 2 | 2.07 |
|   | Polyoxyethylene glycol, average molecular weight 400. | 2 | 2.07 |
|   | Thioglycollic acid | 3 | 2.07 |
| H | 1,1,1-trimethylolpropane | 1 | 0.82 |
|   | Succinic acid | 4 | 0.82 |
|   | "Comerginol 65" | 4 | 0.82 |
|   | Thioglycollic acid | 3 | 0.82 |
| I | "Trimer acid Empol 1043" | 1 | 2.11 |
|   | Butane-1,4-diol | 3 | 2.11 |
|   | 3-mercaptopropionic acid | 3 | 2.11 |
| J | 1,1,1-trimethylolpropane | 1 | 1.95 |
|   | Adipic acid | 2 | 1.95 |
|   | Polyoxypropylene glycol, average molecular weight 425. | 2 | 1.95 |
|   | 3-mercaptopropionic acid | 3 | 1.95 |
| K | 1,1,1-trimethylolpropane | 1 | 1.63 |
|   | Adipic acid | 2 | 1.63 |
|   | 2,2-bis(p-(2-hydroxypropoxy)phenyl)propane. | 2 | 1.63 |
|   | Thioglycollic acid | 3 | 1.63 |
| L | Polyoxypropylene triol, average molecular weight 3000. | 1 | 0.62 |
|   | Adipic acid | 3 | 0.62 |
|   | 2-mercaptoethanol | 3 | 0.62 |
| M | Glycerol | 1 | 1.10 |
|   | Adipic acid | 4 | 1.10 |
|   | Polyoxypropylene glycol, average molecular weight 425. | 4 | 1.10 |
|   | Thioglycollic acid | 3 | 1.10 |
| N | Polyoxypropylene triol, average molecular weight 700. | 1 | 1.36 |
|   | Adipic acid | 3 | 1.36 |
|   | 2,2-bis(p-(2-hydroxypropoxy)phenyl)propane. | 3 | 1.36 |
|   | Thioglycollic acid | 3 | 1.36 |
| O | "Trimer acid Empol 1043" | 1 | 1.09 |
|   | Polyoxypropylene glycol, average molecular weight 425. | 3 | 1.09 |
|   | Thioglycollic acid | 3 | 1.09 |
| P | "Trimer acid Empol 1043" | 1 | 0.85 |
|   | Polyoxyethylene glycol, average molecular weight 300. | 3 | 0.85 |
|   | Thioglycollic acid | 3 | 0.85 |
| Q | Polyoxypropylene triol, average molecular weight 3,000. | 1 | 0.48 |
|   | Succinic anhydride | 3 | 0.48 |
|   | 2-mercaptoethanol | 3 | 0.48 |
| R | Pentaerythritol-propylene oxide tetrol adduct, average molecular weight 650. | 1 | |
|   | "Dimer acid Empol 1022" | 4 | |
|   | 2-mercaptoethanol | 4 | |
| S | Glycerol | 1 | |
|   | Phthalic anhydride | 4 | |
|   | Butane-1,4-diol | 4 | |
|   | Thioglycollic acid | 3 | |

"Trimer acid Empol 1043" denotes a trimerised unsaturated $C_{18}$ fatty acid, having an average molecular weight of about 800 and a carboxyl content of about 3.4 equiv./kg.; it was obtained from Unilever-Emery N.V., Gouda, Holland.

"Comerginol 65" was obtained from Bibby Chemicals Ltd., Liverpool. It has an average molecular weight of about 700, and a hydroxyl value of 155–165. It consists essentially of diprimary alcohols, prepared by catalytic hydrogenation of the methyl esters of long chain aromatic-aliphatic fatty acids, together with, as by-products, small amounts of monohydric and trihydric alcohols.

EXAMPLE I

The cloth used was a wool flannel weighing approximately 170 g. per square metre: the pH of its aqueous extract was 3.1. Samples of the flannel were padded with a 3% solution of the polymercaptan ester in perchloroethylene containing 0.3% of monoethanolamine and 5% of ethanol such that the uptake of the polymercaptan was 8% and that of monoethanolamine was correspondingly 0.8%. Then samples were dried at 50° C. in a fanned oven and stored at room temperature and humidity with free access to the air.

At intervals of from 1 to 22 days after the samples had been impregnated they were washed and dried.

Untreated cloth shrank in area by an average of 22.9%. Results obtained with samples treated in accordance with the method of this invention are shown in Table II.

TABLE II

| Poly-mercaptan | Area shrinkage (percent) after (days) | | | |
|---|---|---|---|---|
| | 1 | 2 | 8 | 22 |
| A | 12.0 | 12.3 | 7.7 | 8.0 |
| B | 6.0 | 9.3 | 6.4 | 5.7 |
| C | 8.3 | 9.3 | 8.0 | 7.0 |
| D | 10.5 | 8.7 | 8.0 | 8.5 |
| E | 8.5 | 7.0 | 7.3 | 6.3 |
| F | 17.3 | 15.0 | 12.7 | 10.0 |
| G | 22.6 | 24.0 | 21.0 | 7.5 |
| H | 12.5 | 13.0 | 8.7 | 7.0 |
| I | 11.3 | 13.3 | 13.7 | 10.3 |
| J | 19.0 | 20.0 | 20.5 | 14.5 |
| K | 9.3 | 13.5 | 13.2 | 10.8 |
| L | 12.5 | 16.3 | 13.5 | 6.4 |
| M | 13.7 | 12.5 | 8.4 | |
| N | 16.0 | 9.0 | 9.5 | 9.4 |
| O | 15.0 | 14.7 | 12.0 | 7.0 |
| P | 8.5 | 7.0 | 7.0 | |
| Q | 12.5 | | | 10.3 |
| R | 6.5 | 3.5 | 5.0 | 5.5 |
| S | 13.7 | 10.7 | 8.0 | |

EXAMPLE II

In this, and succeeding examples, the flannel used was similar to that used in Example I but the pH of its aqueous extract was 7.0. Samples were padded with 1% solutions of polymercaptan esters in trichloroethylene containing various catalysts, and the pick-up was adjusted so that the uptake of the polymercaptan was 3% and that of the catalyst was 0.3% except with copper naphthenate where 0.0041% was picked up. Samples of the flannel were dried at 70° C. in a fanned oven for 10 minutes, and then examined periodically for shrinkage after being washed. Untreated flannel shrank in area by an average of 24% on being washed.

The results are shown in the following table.

TABLE III

| Polymer-captan | Catalyst | Area shrinkage (percent) after (days) | | |
|---|---|---|---|---|
| | | 1 | 2 | 8 |
| B | di-Isopropyl xanthogen disulphide | 11.7 | 10.3 | 8.3 |
| C | do | | 12.1 | 14.9 |
| L | do | | 15.4 | |
| O | do | 6.9 | 4.9 | 4.9 |
| B | N,N'-diethylthiourea | 14.5 | | 11.8 |
| C | do | 13.1 | | 13.6 |
| O | do | 12.6 | | 9.0 |
| B | Tetramethylthiuram disulphide | 12.7 | | 12.7 |
| C | do | 14.5 | | 13.2 |
| O | do | 10.3 | | 8.5 |
| C | Copper naphthenate [1] | 16.7 | 8.4 | |

[1] Corresponds to 0.0009% of copper, calculated on the weight of wool.

EXAMPLE III

Example II was repeated, wool being impregnated to 300% uptake with a solution in perchlorethylene containing 1% of Polymercaptan C and either 0.02% diethylenetriamine ("Solution A") or 0.33% of an epoxide resin and 0.053% of diethylenetriamine ("Solution B") (the epoxide resin was a polyglycidyl ether of 2,2-bis (4-hydroxyphenyl) propane, containing 5.1 1,2-epoxide equiv./kg.). Samples treated with Solution A shrank, on washing after storage for 1 and 2 days, by 13.5 and 9.3% respectively: the corresponding values for samples treated with Solution B were 9.8 and 6.4%.

EXAMPLE IV

An emulsion was prepared by dissolving sodium carboxymethylcellulose (0.5 g.) in water (44.5 g.) heated at 70 to 80° C., allowing the solution to cool, adding 50 g. of a polymercaptan ester and 5 g. of an anionic emulsifying agent, and stirring with a high-speed stirrer for 5 minutes. (The anionic emulsifying agent was an adduct of 1 mol. of a mixture of $C_{16}$–$C_{18}$ n-alkyl primary amines and 70 mol. of ethylene oxide.)

A 6 g. portion of this emulsion was diluted with 144 g. of water, and mixed with 0.3 g. of N,N'-diethylthiourea, 0.3 g. of monoethanolamine 0.3 g. sodium dibutyldithiocarbamate, or 0.135 g. of 100 volume hydrogen peroxide. In one experiment the catalyst was omitted. The diluted emulsion was padded onto wool flannel, so that the take-up of the polymercaptan was 3%, and that of the catalysts was 0.3%, except in the case of hydrogen peroxide where the pick up was 0.035%. Results obtained after washing were:

TABLE IV

| Polymer-captan | Catalyst | Area shrinkage (percent) after (days) | | |
|---|---|---|---|---|
| | | 1 | 2 | 8 |
| C | None | 14.4 | | |
| C | N,N'-diethylthiourea | 14.4 | | |
| C | Sodium dibutyldithiocarbamate | 15.8 | | |
| B | Monoethanolamine | 9.8 | | 10.7 |
| C | do | 14.4 | | |
| P | do | | | |
| L | do | 9.3 | 13.1 | 9.3 |
| O | do | 4.0 | 6.4 | 4.9 |
| C | Hydrogen peroxide | 14.0 | | |

EXAMPLE V

Wool flannel was simultaneously set and shrinkproofed by padding with an aqueous mixture containing, per litre, 85.7 g. of the emulsion of Polymercaptan C prepared as in Example IV, 20 g. of monoethanolamine, and 29 g. of 70% aqueous monoethanolamine sesquisulphite, to an uptake of 70%, and steaming wet for 2½ minutes, either flat or having a crease. On being washed, the flannel retained its crease. Untreated flannel did not retain its crease. Flannel treated with only monoethanolamine and monoethanolamine sesquisulphite had similar shrinkage to untreated flannel, and did not retain its crease as well as that treated with the polymercaptan.

EXAMPLE VI

Wool flannel was treated with an aqueous solution containing 29 g. per litre of 70% monoethanolamine sesquisulphite and 20 g. per litre of monoethanolamine so that the take-up was 70%, and samples were then steamed wet for 2½ minutes, either flat or with a crease inserted. They were then impregnated to 300% uptake with perchlorethylene containing 1% of a polymercaptan ester and 0.02% of diethylenetriamine. Next, they were dried in an oven at 70° C. for 10 minutes. Samples which had been flatset were sprayed with the aqueous solution of monoethanolamine and monoethanolamine sesquisulphite used previously, and were steamed wet for 2½ minutes to insert a crease. All the samples were stored as before, and then washed. The results obtained are displayed in the following table.

TABLE V

| Polymer-captan | Area shrinkage (percent) after (days) | | | Crease retention after (days) | | | | | |
|---|---|---|---|---|---|---|---|---|---|
| | | | | Pre-creased | | | Post-creased | | |
| | 1 | 2 | 8 | 1 | 2 | 8 | 1 | 2 | 8 |
| B | 11.7 | 8.3 | 5.4 | r | g | r | g | g | v.g |
| C | 15.4 | 11.2 | 9.3 | r | r | g | r | r | v.g |
| L | 19.5 | 8.8 | 7.4 | r | r | g | v.g | v.g | v.g |
| O | 8.3 | 7.9 | 7.9 | g | v.g | v.g | v.g | g | v.g |

NOTE.—r=crease retained; g=good retention; v.g=very good retention.

We claim:
1. Process for modifying fibrous keratinous material which comprises
   (1) treating the material with an ester having an average molecular weight of at least 400 and at most 10,000, containing at least two mercaptan groups per molecule, and which is the product obtainable by the reaction of

(a) a compound selected from the group consisting of monomercaptomonocarboxylic acids of the formula

HOOC—R—SH and monomercaptomonohydric alcohols of the formula

HO—R—SH where R represents a divalent organic radical and the indicated HOOC— and HO— groups are directly bound to carbon atoms of the radical R, and the indicated —SH groups are directly bound to the same or different carbon atoms of the radical R, (b) a compound containing, per molecule, at least two alcoholic hydroxyl groups, and (c) a compound containing, per molecule, at least two carboxylic acid groups, and (2) curing the ester on the material.

2. Process according to claim 1, wherein the ester contains at least three and at most six mercaptan groups per molecule.

3. Process according to claim 1, wherein the ester is one obtainable by the reaction, in any desired sequence, of (a) a compound selected from the group comprising monomercaptomonocarboxylic acids and monomercaptomonohydric alcohols, (e′) a compound containing at least three but not more than six carboxylic acid groups per molecule, (f″) a compound containing at least two but not more than six alcoholic hydroxyl groups per molecule, and (h) a compound selected from the group comprising mercapto-free monohydric alcohols and mercapto-free monocarboxylic acids.

4. Process according to claim 1, wherein the monomercaptomonocarboxylic acid (a) is also of the formula HOOC.C$_r$H$_{2r}$SH, where $r$ is a positive integer of at least one and at most twenty-four.

5. Process according to claim 4, wherein $r$ is at least one and at most two.

6. Process according to claim 1, wherein the monomercaptomonohydric alcohol (a) is of formula HO.C$_t$H$_{2t}$SH where $t$ is a positive integer of at least two and at most 18.

7. Process according to claim 6, where $t$ is at least two and at most three.

8. Process according to claim 1, in which the polymercaptan ester contains, directly attached to carbon atoms, on average $n$ groups of the formula —(O)$_a$—CO—(O)$_b$—R$_1$—(O)$_b$—CO—(O)$_a$—RSH per molecule, where $a$ and $b$ are selected from a group consisting of zero and 1, but are not the same, $n$ is an integer of at least 3 and at most 6, R$^1$ denotes a divalent organic radical which is directly linked through at least one carbon atom thereof to the indicated —O— and —CO— units, and R denotes a divalent organic radical.

9. Process according to claim 1, in which the average structure of the ester is selected from the group consisting of

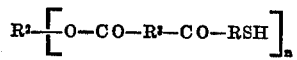
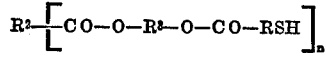
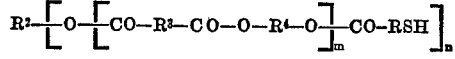
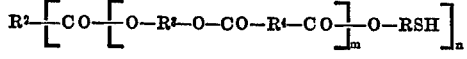
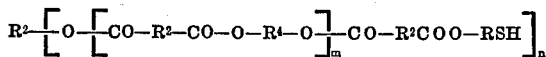
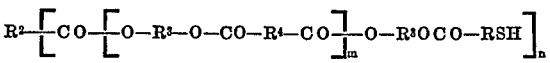

wherein R$^2$ denotes an organic radical containing at least three carbon atoms and directly linked through carbon atoms thereof to the indicated mercaptan-terminated ester chains, R$^3$ and R$^4$ each denote a divalent organic radical which is directly linked through at least one carbon atom thereof to the indicated —O— and —CO— units, R denotes a divalent organic radical, $m$ denotes an integer of at least one, and $n$ denotes an integer of at least three and at most six.

10. Process according to claim 1, in which the average structure of the ester is selected from the group consisting of

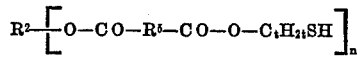
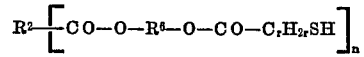
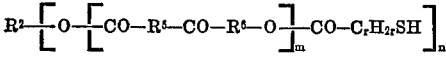
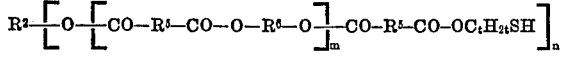
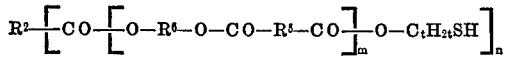

where R$^2$ denotes an organic radical containing at least three carbon atoms and directly linked through carbon atoms thereof to the indicated mercaptan-terminated ester chains, R$^5$ denotes the residue of dicarboxylic acid after removal of the —COOH groups, R$^6$ denotes the residue of a dihydric alcohol after removal of the two hydroxyl groups, $r$ is a positive integer of at least one and at most twenty-four, $t$ is a positive integer of at least two and at most eighteen, $m$ denotes an integer of at least one, and $n$ denotes an integer of at least three and at most six.

11. Process according to claim 1, in which there is used from 0.5 to 15% by weight of the said ester, based on the weight of the fibrous keratinous material treated.

12. Process according to claim 1, in which the treated fibrous keratinous material is heated to a temperature in the range 30° C. to 180° C. to cure the said ester.

13. Process according to claim 1, in which the keratinous fibres are treated with the said ester at a pH of from 7.5 to 12.

14. Process according to claim 1, wherein a catalyst for curing the said ester is also applied, said catalyst being selected from the group comprising siccatives, oxidative curing agents, free-radical catalysts, sulfur, mercaptobenzothiazoles, dithiocarbamates, thiuram sulphides, thioureas, dialkyl disulphides, dicycloalkyl disulphides, diaralkyl disulphides, alkyl xanthogen disulphides and alkyl xanthates.

15. Process according to claim 1, wherein the ester contains at least three and at most six mercaptan groups per molecule.

16. Process according to claim 1, wherein the compound (b) contains not more than two alcoholic hydroxyl groups, and the compound (c) contains at least three carboxylic acid groups.

17. Process according to claim 1, wherein the compound (b) contains at least three alcoholic hydroxyl groups and the compound (c) contains not more than two carboxylic acid groups.

18. Process according to claim 1, wherein (b) comprises a mixture of a compound containing not more than two alcoholic hydroxyl groups, and a compound containing at least three and not more than six alcoholic hydroxyl groups, and compound (c) contains not more than two carboxylic acid groups.

19. Process according to claim 1, wherein compound (b) contains not more than two alcoholic hydroxyl groups and (c) comprises a mixture of a compound containing at least three but not more than six carboxylic acid groups and a compound containing not more than two carboxylic acid groups.

20. Keratinous fibrous material bearing thereon an ester having an average molecular weight of at least 400 and at most 10,000, containing at least two mercaptan groups per molecule and which is the product obtainable by the reaction of
(a) a compound selected from the group consisting of monomercaptomonocarboxylic acids of the formula HOOC—R—SH, and monomercaptomonohydric alcohols of the formula HO—R—SH where R represents a divalent organic radical and the indicated HOOC— and HO— groups are directly bound to carbon atoms of the radical R, and the indicated —SH groups are directly bound to the same or different carbon atoms of the radical R, (b) a compound containing, per molecule, at least two alcoholic hydroxyl groups and
(c) a compound containing, per molecule, at least two carboxylic acid groups.

References Cited
UNITED STATES PATENTS

| | | | |
|---|---|---|---|
| 2,719,813 | 10/1955 | Haefele | 260—127.3 |
| 3,078,138 | 2/1963 | Miller et al. | 8—127.5 |
| 3,230,144 | 1/1966 | Jensen et al. | 8—127.5 |
| 3,301,700 | 1/1967 | Maloney | 8—127.5 |
| 3,399,682 | 9/1968 | Isaji et al. | 8—127.5 |
| 3,459,198 | 8/1969 | Zenlin et al. | 8—127.5 |
| 3,466,136 | 9/1969 | Wesley et al. | 8—127.5 |

GEORGE F. LESMES, Primary Examiner

J. P. BRAMMER, Assistant Examiner

U.S. Cl. X.R.

8—115.7, 112, 127.5; 117—139.4, 141, 161 K, 161 KP, 161 LM; 260—76, 77

UNITED STATES PATENT OFFICE
CERTIFICATE OF CORRECTION

Patent No. 3,703,352          Dated November 21, 1972

Inventor(s) Bryan Dobinson et al

It is certified that error appears in the above-identified patent and that said Letters Patent are hereby corrected as shown below:

Column 14, line 1, formula should read: ---

$$R^2 \text{---}[\text{---} O \text{---}[\text{---} CO \text{---} R^3 \text{---} CO \text{---} O \text{---} R^4 \text{---} O \text{---}]_m \text{---} CO \text{---} R^2 COO \text{---} RSH]_n \quad \text{---.}$$

Column 14, line 24, formula should read: ---

$$R^2 \text{---}[\text{---} O \text{---}[\text{---} CO \text{---} R^5 \text{---} CO \text{---} O \text{---} R^6 \text{---} O \text{---}]_m \text{---} CO \text{---} C_r H_{2r} SH]_n \quad \text{---.}$$

Signed and sealed this 5th day of March 1974.

(SEAL)
Attest:

EDWARD M. FLETCHER, JR.          C. MARSHALL DANN
Attesting Officer                 Commissioner of Patents